US011436230B1

(12) United States Patent
Arunachalam et al.

(10) Patent No.: US 11,436,230 B1
(45) Date of Patent: Sep. 6, 2022

(54) CROSS-TENANT PEOPLE SEARCH IN A MULTI-TENANT COMPUTING SYSTEM

(71) Applicant: Microsoft Technology Licensing, LLC, Redmond, WA (US)

(72) Inventors: Shankaranand Arunachalam, Redmond, WA (US); Robert Allen Lowe, Redmond, WA (US); Jason Craig Nelson, Woodinville, WA (US); Paul Baecke, London (GB); Xiaoqin Zhu, Redmond, WA (US); Ganesh Pandey, Redmond, WA (US); Parul Manek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/244,452

(22) Filed: Apr. 29, 2021

(51) Int. Cl.
*G06F 16/2455* (2019.01)
*G06F 16/2457* (2019.01)
*G06F 16/248* (2019.01)
*G06F 21/62* (2013.01)

(52) U.S. Cl.
CPC ...... *G06F 16/24556* (2019.01); *G06F 16/248* (2019.01); *G06F 16/24568* (2019.01); *G06F 16/24578* (2019.01); *G06F 21/6227* (2013.01)

(58) Field of Classification Search
CPC ......... G06F 16/24556; G06F 16/24568; G06F 16/24578; G06F 16/248; G06F 21/6227
See application file for complete search history.

(56) References Cited

U.S. PATENT DOCUMENTS

| 10,152,577 | B2* | 12/2018 | Li | G06F 21/6218 |
|---|---|---|---|---|
| 11,061,548 | B1* | 7/2021 | Catakli | G06F 3/0482 |
| 11,082,487 | B1* | 8/2021 | Jain | H04L 41/0806 |
| 11,093,493 | B1* | 8/2021 | Krishnaswamy | G06F 16/2453 |
| 11,315,041 | B1* | 4/2022 | Jain | G06N 20/00 |
| 2011/0106789 | A1* | 5/2011 | Gao | G06F 16/2471 707/E17.017 |
| 2012/0173589 | A1* | 7/2012 | Kwon | G06F 16/2282 707/E17.005 |
| 2014/0040294 | A1* | 2/2014 | An | G06F 16/245 707/756 |
| 2014/0075565 | A1* | 3/2014 | Srinivasan | H04L 63/101 726/26 |
| 2016/0156671 | A1* | 6/2016 | Cabrera | H04L 63/107 726/1 |

(Continued)

*Primary Examiner* — Jorge A Casanova
(74) *Attorney, Agent, or Firm* — Christopher J. Volkmann; Kelly, Holt & Christenson, PLLC

(57) ABSTRACT

In a multi-tenant computing system, a cross-tenant user search system receives a user search input from a user using a client of a first tenant. The cross-tenant user search system accesses a policy that identifies one or more related tenants that are related to the first tenant. The policy also identifies directory records of users in the related tenant that can be searched by users of the first tenant. The cross-tenant user search system executes a search against a directory for the first tenant and executes a separate search against the directory records in the related tenants, identified in the policy. The search results from searching the directory for the first tenant and the related search results from searching the directory records in the tenant are aggregated into an aggregated set of search results which are then returned to the client.

18 Claims, 10 Drawing Sheets

(56) References Cited

U.S. PATENT DOCUMENTS

| | | | | |
|---|---|---|---|---|
| 2017/0331791 A1* | 11/2017 | Wardell | ............. | H04L 41/0893 |
| 2019/0236062 A1* | 8/2019 | Proctor | ................ | H04L 9/3073 |
| 2019/0306237 A1* | 10/2019 | Srinivasan | ............ | H04W 12/10 |
| 2020/0007529 A1* | 1/2020 | Bahrenburg | ........ | H04L 63/0442 |
| 2020/0042737 A1* | 2/2020 | Lee | ....................... | G06F 16/245 |
| 2021/0136083 A1* | 5/2021 | Gordon | ................ | H04W 12/08 |
| 2021/0141923 A1* | 5/2021 | Wu | ..................... | G06F 21/6236 |

\* cited by examiner

CROSS-TENANT PEOPLE SEARCH IN A MULTI-TENANT COMPUTING SYSTEM

BACKGROUND

Computing systems are currently in wide use. Some computing systems host computing system resources such as services, applications, infrastructure and other resources for tenants.

In multi-tenant environments, the computing system resources can be hosted for multiple different tenants, where each tenant may correspond to an organization. Each tenant may have a plurality of different users that access the computing system resources hosted for its tenant. The users often use client computing systems to access the resources.

The discussion above is merely provided for general background information and is not intended to be used as an aid in determining the scope of the claimed subject matter.

SUMMARY

In a multi-tenant computing system, a cross-tenant user search system receives a user search input from a user of a client of a first tenant. The cross-tenant user search system accesses a policy that identifies one or more related tenants that are related to the first tenant. The policy also identifies directory records of users in the related tenant that can be searched by users of the first tenant. The cross-tenant user search system executes a search against a directory for the first tenant and executes a separate search against the directory records in the related tenants, identified in the policy. The search results from searching the directory for the first tenant and the related search results from searching the directory records in the related tenant are aggregated into an aggregated set of search results which are then returned to the client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, a multi-tenant computing system can host computing system resources (such as data storage, applications, functionality, infrastructure and other computing system resources) for a plurality of different tenants. Each tenant may have its own directory of users. The directory for a tenant may include records corresponding to different users where each record has a plurality of different user properties, such as username, email address, location, etc. Also, multi-tenant computing systems often host electronic mail services and other services for users of a tenant. When the user of a first tenant wishes to perform a search for another user, the user of the first tenant often interacts with a search interface that may be provided in order to do user searches. In one example, the search interface may be provided through the electronic mail system. This is just one way of providing an interface to conduct user searches and other mechanisms for conducting user searches can be used as well, such as providing a separate search service that is not part of the email service.

The searching user often types in a user search query (such as a username, email address, etc.) into the search interface through a client device, and the user search query is processed by the search system. The search system executes the query against the user directory of the first tenant. The search results are then returned to the client device and surfaced for the requesting user.

However, it is not uncommon for a first tenant to acquire or merge with another tenant, or to acquire or merge with a division or sub-unit of another tenant. In such a scenario, the tenant that is acquired (or merged with), or the tenant that formerly owned the division or sub-unit that is acquired or merged with is referred to as a related tenant in that it is related to the first tenant. It can be difficult to implement a system which allows the users of the two related tenants to search for one another. This is because the directories of the two different tenants are often maintained separately in a multi-tenant computing system prior to the acquisition or merger.

In some current systems, in order to allow users of the now-related tenants to search for one another, the directories for one or both related tenants are manually exported from one or both related tenants and imported into the other of the related tenants. This is highly cumbersome, time consuming, and can be error prone. Also, where the users of the first tenant are not supposed to have access to all of the users of the related tenant (but instead should only have access to a subset of the users of the related tenant) this can present additional challenges, especially as users join and leave the different tenants or organizations.

Figure 1:
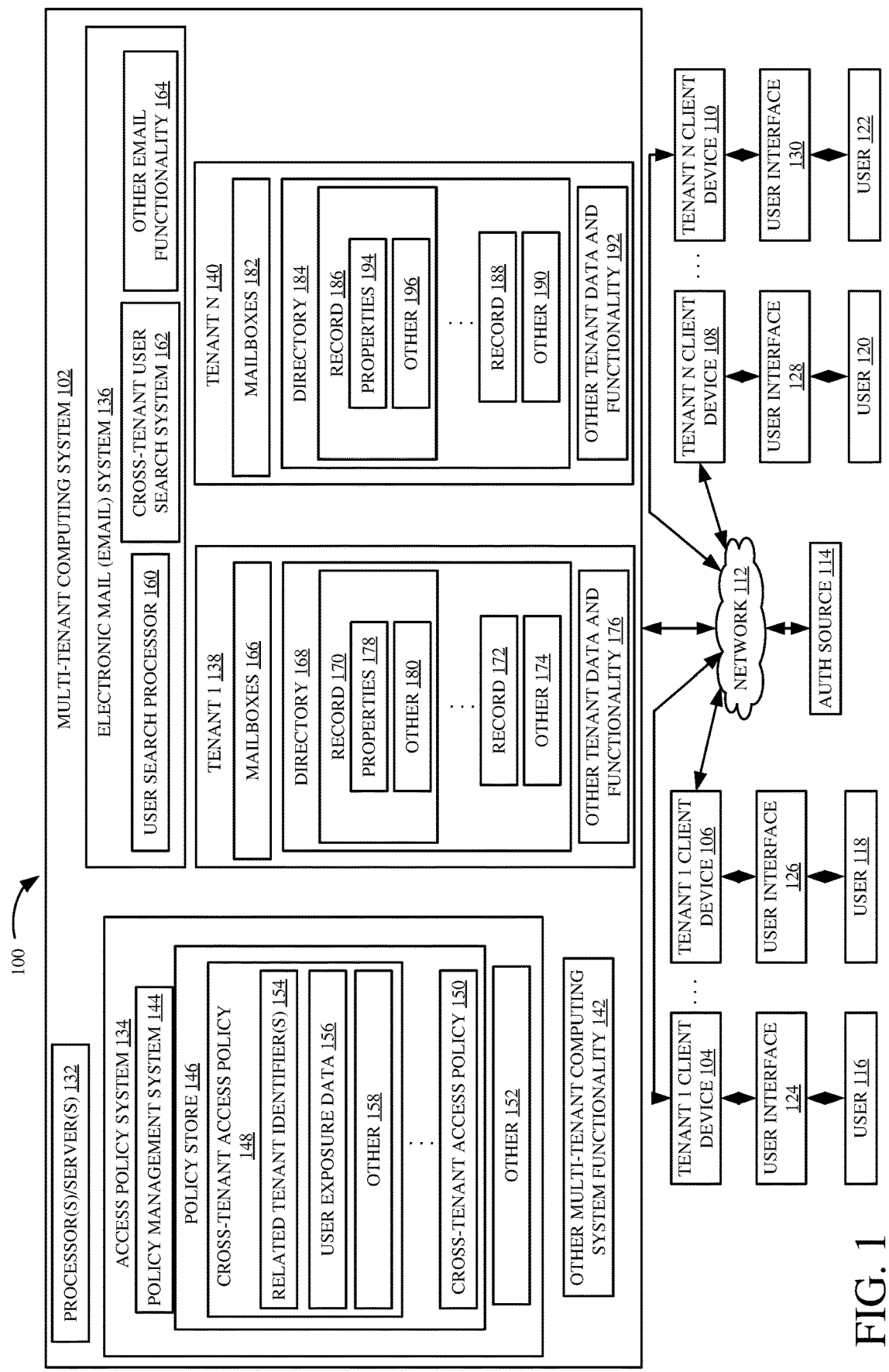
FIG. 1 is a block diagram of one example of a computing system architecture.

The present discussion thus proceeds with respect to a multi-tenant search system in which a cross-tenant access policy identifies related tenants and identifies the particular users of the related tenants that may be accessed by other users of the related tenants. Then, when a user search query is received from a requesting client of a first tenant, the cross-tenant access policy for the first tenant is processed to identify any related tenants. If there are related tenants, the cross-tenant access policy is further processed to determine which users in a second related tenant may be searched by the users of the first related tenant. The user search query is then executed against the directory for the first related tenant and a second search is performed against the records in the directory of the second related tenant that correspond to users that may be accessed by users of the first related tenant. The search results from the directories of both tenants are then aggregated and returned as aggregated search results to the requesting client. In this way, the directories of the two tenants need not be exported and imported. Similarly, as users join and leave different tenant organizations, the users can be added to or deleted from the cross-tenant access policies so that cross-tenant user searches can be performed in a highly efficient manner FIG. 1 is a block diagram of one example of a computing system architecture 100 that includes multi-tenant computing system 102 coupled to a plurality of different client devices 104, 106, 108 and 110 over a network 112. Multi-tenant computing system 102 can also communicate with an authorization service 114 over network 112. In the example shown in FIG. 1, client devices 104-106 are used by users 116-118 that are members of a first tenant or organization (tenant 1) that is served by multi-tenant computing system 102. Client devices 108-110 are used by users 120-122 that are members of another tenant (tenant N) that is served by multi-tenant computing system 102. Therefore, client device 104 generates user interfaces 124 for interaction by user 116. Client device 106 generates user interfaces 126 for interaction by user 118. User 116 interacts with user interfaces 124 in order to control and manipulate client device 104 and some portions of multi-tenant computing system 102. User 118 interacts with user interfaces 126 in order to control and manipulate client device 106 and some portions of multi-tenant computing system 102.

Similarly, client device 108 generates user interfaces 128 and client device 110 generates user interfaces 130. Therefore, user 120 can interact with user interfaces 128 in order to control and manipulate client device 108 and some portions of multi-tenant computing system 102. User 122 may interact with user interfaces 130 in order to control and manipulate client device 110 and some portions of multi-tenant computing system 102. Client devices 104, 106, 108 and 110 may be desktop computing devices, laptop computing devices, tablet computing device, mobile devices, etc. Each client device 104-110 illustratively has one or more processors or servers, data storage, and client device functionality that allows the client device to generate the corresponding user interfaces and communicate with multi-tenant computing system 102.

FIG. 1 also shows that multi-tenant computing system 102 may include one or more processors or servers 132, access policy system 134, electronic mail (email) system 136, a set of computing system resources 138, such as data, functionality, and other resources for tenant 1, and a set of computing system resources 140, such as data, functionality, and other resources for tenant N. Multi-tenant computing system 102 may also include a wide variety of other multi-tenant computing system functionality 142. Functionality 142 illustratively provides a front-end to multi-tenant computing system 102 that exposes application programming interfaces, or other interfaces that can be accessed by client devices 104-110. Functionality 142 may also include a back-end system that manipulates data, functionality, and other resources of the tenants based upon inputs from the various users 116-122. Access policy system 144, in one example, includes policy management system 144, policy store 146 that stores a plurality of different cross-tenant access policies 148-150, and other items 152. Cross-tenant access policy 148 may have related tenant identifiers 154, user exposure data 156, and other items 158.

FIG. 1 also shows an example in which email system 136 may include user search processor 160, cross-tenant user search system 162, and other email functionality 164. User search processor 160 can be used by a user of a first tenant to perform user searches for users within the first tenant while cross-tenant user search system 162 can be used by users for one tenant to perform searches for users of a related tenant. It will be noted that user search functionality can be provided in multi-tenant computing system 102 external to email system 136. The user search functionality (processor 160 and system 162) is shown as part of email system 136 as an example only.

The computing system resources 138 for tenant 1 may include mailboxes 166 for the different users 116-118 of tenant 1, a directory 168 that has a plurality of records 170-172 and other items 174, and a wide variety of other tenant data and functionality 176. Each record 170 may include a set of properties 178 and other items 180. Similarly, the computing system resources 140 for tenant N may include one or more mailboxes 182 for users 120-122 of tenant N, a directory 184 that includes records 186-188 and other items 190, as well as a wide variety of other tenant data and functionality 192. Each of the records 186-188 may include a set of properties 194 and other items 196.

Before describing multi-tenant computing system 102, and its operation, in more detail, a brief description of some of the items in multi-tenant computing system 102 and their operation will first be provided. Policy management system 144 can be used to generate, and edit and maintain, cross-tenant access policies 148-150 which are described below. In the example illustrated in FIG. 1, email system 136 provides email and user search services to tenants 1-N. Therefore, user 116, for instance, may search for user 118 in the directory 168 of tenant 1. Searches for users can be performed using user search processor 160 in email system 136.

In order for user 116 to search for user 118, client device 104 generates a user interface 124 that allows user 116 to enter a search term or search query for the user 118. The search term or search query may include the name of user 118, the title of user 118, the email address of user 118, or other structured or free-text inputs. The search term or search query is provided through client device 104 to user search processor 160 in the email system 136. User search processor 160 searches the directory 168 of tenant 1 for one or more records 170-172 that match the search terms. User search processor 160 provides the search results as record indicators that indicate the matching records 170-172 that match the search terms.

As discussed above, it is not uncommon for one tenant to acquire, merge with, or otherwise become related to another tenant, or a portion of another tenant. Therefore, assume for the sake of the present discussion that tenant 1 has acquired a subdivision of tenant N. The subdivision will include a set of users 128-130 that have corresponding records 186-188 in directory 184. In one example, the relationship between tenant 1 and the acquired portion of tenant N is reflected in a cross-tenant access policy 148 in access policy system 144. The cross-tenant access policy 148 includes related tenant identifiers 154 that identify the two tenants (tenant 1 and tenant N) as related tenants. The cross-tenant access policy 148 also includes user exposure data 156 that identifies a list of directory records for the particular users 120-122 in tenant N that will be searchable by users 116-118 in tenant 1. Similarly, the user exposure data 156 can identify a list of directory records for the particular users 116-118 in tenant 1 that will be searchable by particular users 120-122 in tenant N.

As an example, assume now that user 116 wishes to search for another user 120 that is part of tenant N and thus has a corresponding record 186 in directory 184 of tenant N. User 116 thus inputs the search request and user search processor 160 searches directory 168 for tenant 1 (which user 116 belongs to) based on the search terms. At the same time, cross-tenant user search system 162 identifies cross-tenant access policy 148 and related tenant identifiers 154 in policy 148 to see that tenant 1 and tenant N are identified as related tenants. Cross-tenant user search system 162 also analyzes the user exposure data 156 on both sides of the cross-tenant access policy 148 to see which users of tenant 1 may search for which users in tenant N and which users in tenant N will be exposed to (or searchable by) the users of tenant 1. Cross-tenant user search system 162 identifies the records 186-188 corresponding to the exposed users in tenant N and launches a separate search (based upon the search terms entered by user 116) against those records 184-186 from directory 184 to search for user records in the directory 184 of tenant N that match the search requests. Cross-tenant user search system 162 then combines or aggregates the results of searching directory 184 with the results of searching directory 168 and provides the combined search results back to client device 184 where they can be presented through user interfaces 124 to user 116.

It will also be noted that the search results can be ranked in preferential order based upon ranking criteria, some of which are described below. It will also be noted that cross-tenant search system 162 may find multiple cross-tenant access policies 148-150 or a single policy 148 that shows that tenant 1 is related to multiple other tenants in addition to tenant N. When tenant 1 is related to multiple other tenants, cross-tenant user search system 162 performs the same analysis of the cross-tenant access policy to identify users in the directories corresponding to each of the related tenants and performs a fan out search, launching a search against the records in each of those directories that identify user records of users who are exposed to the search from user 116. Cross-tenant user search system 162 then aggregates all of the searches that were performed against all of those directories in the related tenants into a set of search results that can be returned to user 116 through client device 104. These and other scenarios are described in greater detail below.

Figure 2:
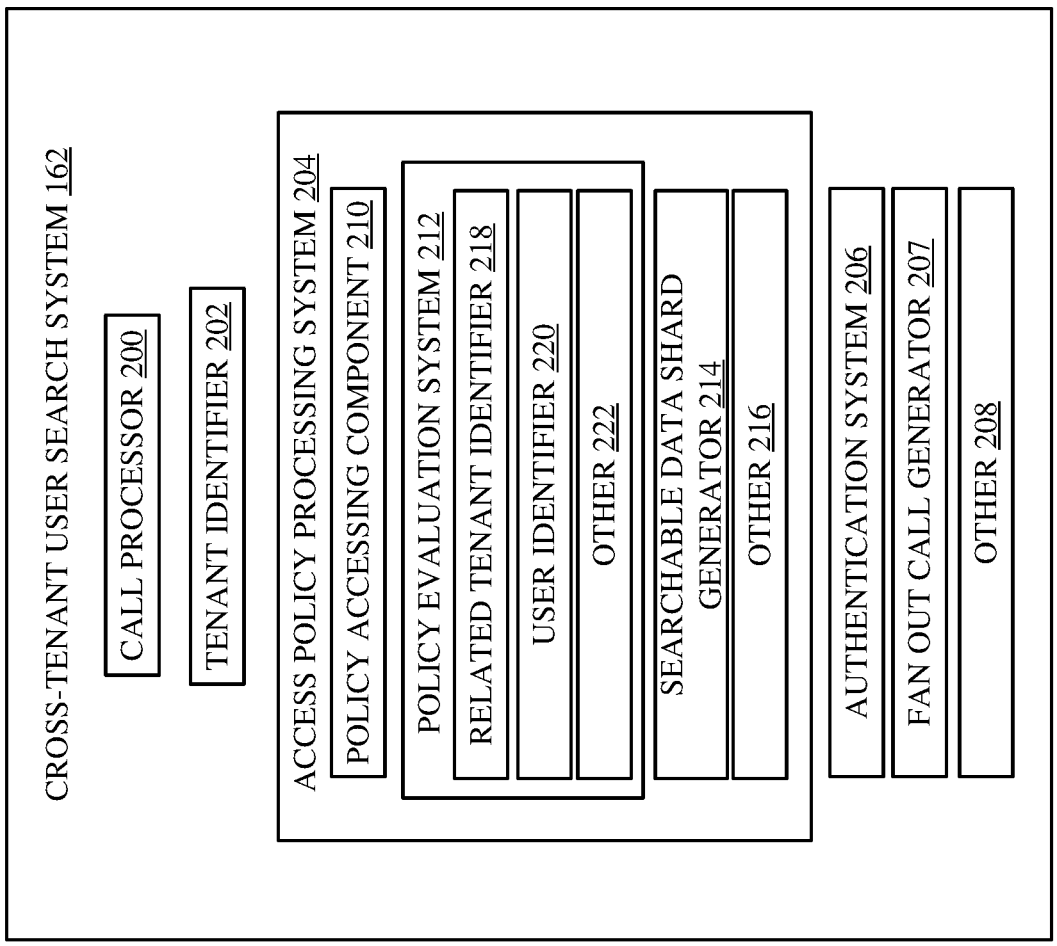
FIG. 2 is a block diagram of one example of a cross-tenant search system.

FIG. 2 is a block diagram showing one example of cross-tenant user search system 162 in more detail. FIG. 2 shows that cross-tenant user search system 162 may include a call processor 200, tenant identifier 202, access policy processing system 204 authentication system 206, and other items 208.

Policy management system 144 can be used to generate, edit and maintain cross-tenant access policies 248-250 which are described in more detail below.

Access policy processing system 204 may include policy accessing component 210, policy evaluation system 212, searchable shard generator 214 and other items 216. Policy evaluation system 212 may include related tenant identifier 218, user identifier 220 and other items 222.

Call processor 200 receives the call (or search request to perform a user search) and begins parsing it. Tenant identifier 202 identifies the tenant from which the call originated (e.g., in the current example, client device 104 belongs to tenant 1) and access policy processing system 204 identifies whether there are any policies for the identified tenant and then analyzes or evaluates the policies. For instance, each cross-tenant access policy may be indexed or otherwise identified by the tenants that are included in the policy. Thus, for example, assume that cross-tenant access policy 148 is a policy that shows that tenant 1 is related to tenant N. In such a scenario, policy 148 may be indexed by reference to both tenant 1 and tenant N. Therefore, when a user search query is received, and the tenant from which it originated is identified, policy accessing component 210 accesses policy store 146 to identify any cross-tenant access policies 148-150 that are indexed by tenant 1, and may show related tenants. Policy evaluation system 212 then evaluates any of the policies that correspond to tenant 1. The related tenant identifier(s) 154 may be fields in policy 148 that list any related tenants that are related to tenant 1. User exposure data 156 may be fields in the policy 148 that list user records in the directory 168 of tenant 1 that may be searched by certain users of tenant N and user records in the directory 184 of tenant N that may be searched by certain users of tenant 1. Related tenant identifier 218 identifies the related tenant or tenants in the policy (e.g., tenant N) and user identifier 220 analyzes the user exposure data 156 to determine which users in both tenants may access the users of the other tenants.

Searchable shard generator 214 then generates a data shard which may comprise the directory records for the users of tenant N that are exposed through the policy as being searchable by users of tenant 1. Authentication system 206 interacts with auth service 114 to obtain an authentication token (or other authentication and authorization data) that will be used to authenticate to processor 160 and system 162.

Cross-tenant user search system 162 then provides an output indicating the searchable data shard (or other searchable data set) and the authentication information generated by authentication system 206 to user search processor 160 which conducts fanout searches against the various user data shards corresponding to related tenants as discussed below.

Figure 3:
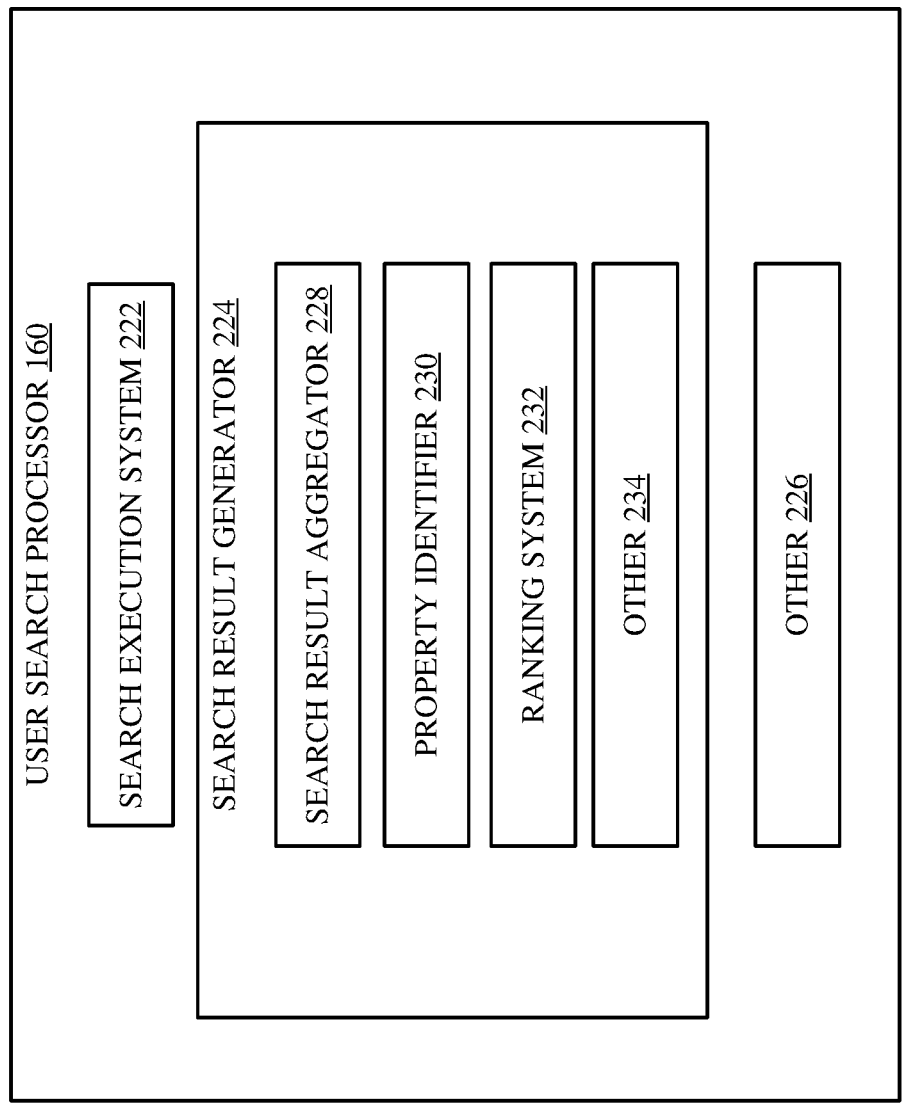
FIG. 3 is a block diagram of one example of a search processor.

FIG. 3 is a block diagram illustrating one example of user search processor 160 in more detail. In the example shown in FIG. 3, user search processor 160 may include search execution system 222, search result generator 224, and other items 226. Search result generator 224 may include search result aggregator 228, property identifier 230, ranking system 232 and other items 234.

It will also be noted that cross-tenant user search system 162 may have its own search functionality to execute the search and the fanout searches against related tenants as well, or system 162 can output information to user search processor 160 so that user search processor 160 executes the search and the fan out searches.

Search execution system 222 executes the user search against the directory for the tenant that originated the search (in this case tenant 1) and the fan out searches against the directories for the related tenants (in this case tenant N). For instance, search execution system 222 may receive the search input or query from client device 104 and execute a search against directory 168. Similarly, search execution system 222 may receive an output from cross-tenant user search system 162 identifying a set of records (e.g., a searchable data shard) for each related tenant that is to be searched using the search input or query. Search execution system 222 then generates a separate search and executes the separate search against that searchable data shard.

Search result generator 224 generates search results from the executed searches. Search result aggregator 228 aggregates the search results from the search of directory 168 and from any fanned out searches. For instance, if the search is fanned out to search multiple different data shards or sets of user records from related tenants, then the results of each of those searches is aggregated by search result aggregator 228 into a single set of search results. It may be that not all properties of the data records in the search results are to be surfaced in response to the user search. For instance, the properties may show user name, user email address and user salary. In that case, it may be that user name and user email address are generally available but user salary is restricted. Therefore, property identifier 230 identifies the particular properties in the search results that may be exposed to the searching user (e.g., user 116). For instance, it may be that based upon the role of user 116, or other criteria, user 116 may only be able to see a subset of the properties in the records in the various directories 168 and 184 that were searched. Thus, property identifier 230 identifies the properties that will be surfaced for user 116 in the search results.

Ranking system 232 may rank the search results based on a variety of different ranking criteria. By way of example, the search results may correspond to other users that user 116 interacts with more or less frequently. The frequency of interaction with a user may be used to rank the search results. In another example, the search results may belong to users at different office locations. Those that are from the same office location as user 116 may be ranked higher than those that are at different office locations. Ranking system 232 may rank the search results based on a wide variety of other ranking criteria as well.

Figure 4A:
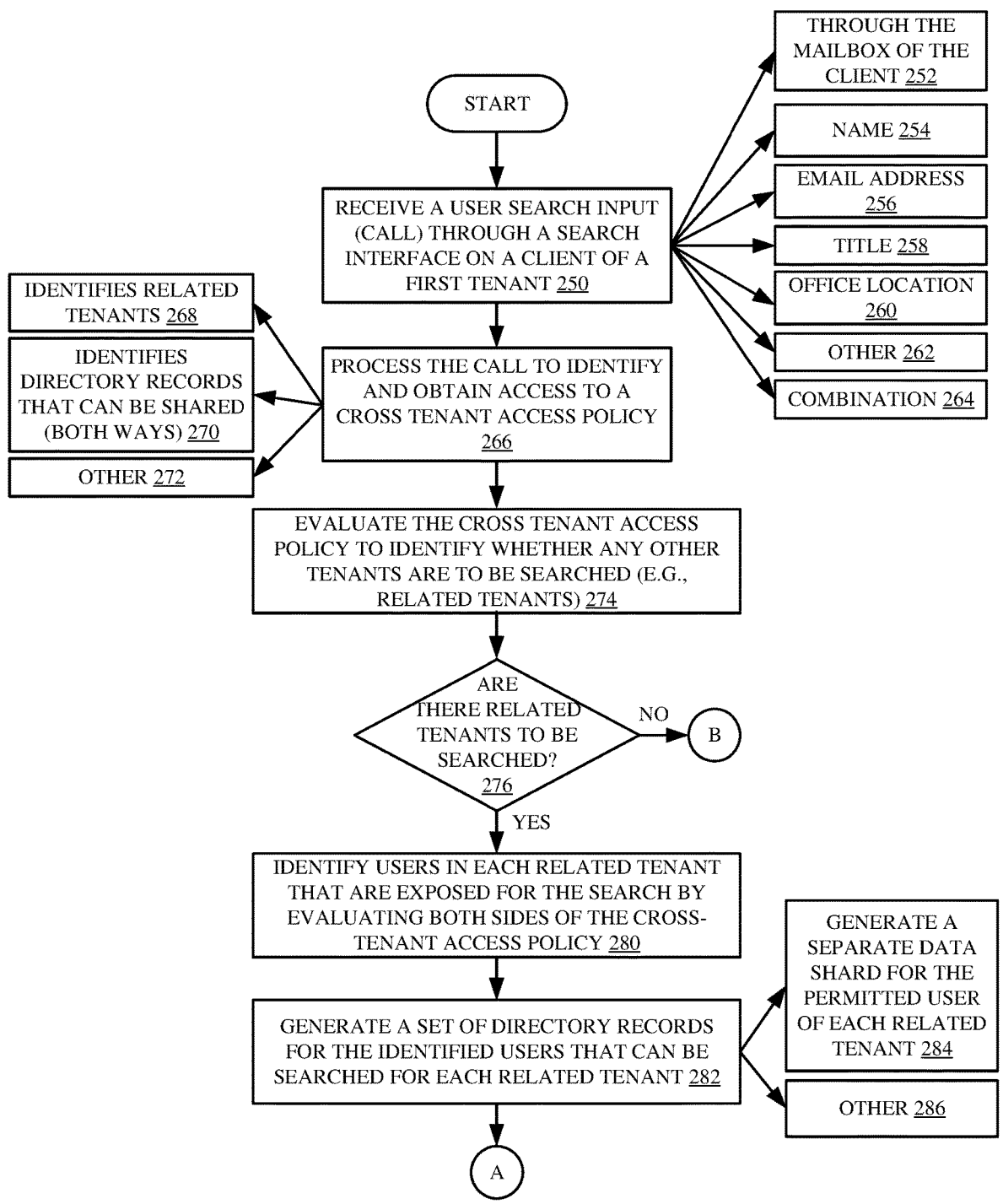
FIGS. 4A and 4B (collectively referred to herein as FIG. 4) illustrate a flow diagram showing one example of the operation of a multi-tenant computing system in performing a cross-tenant user search.
Figure 4B:
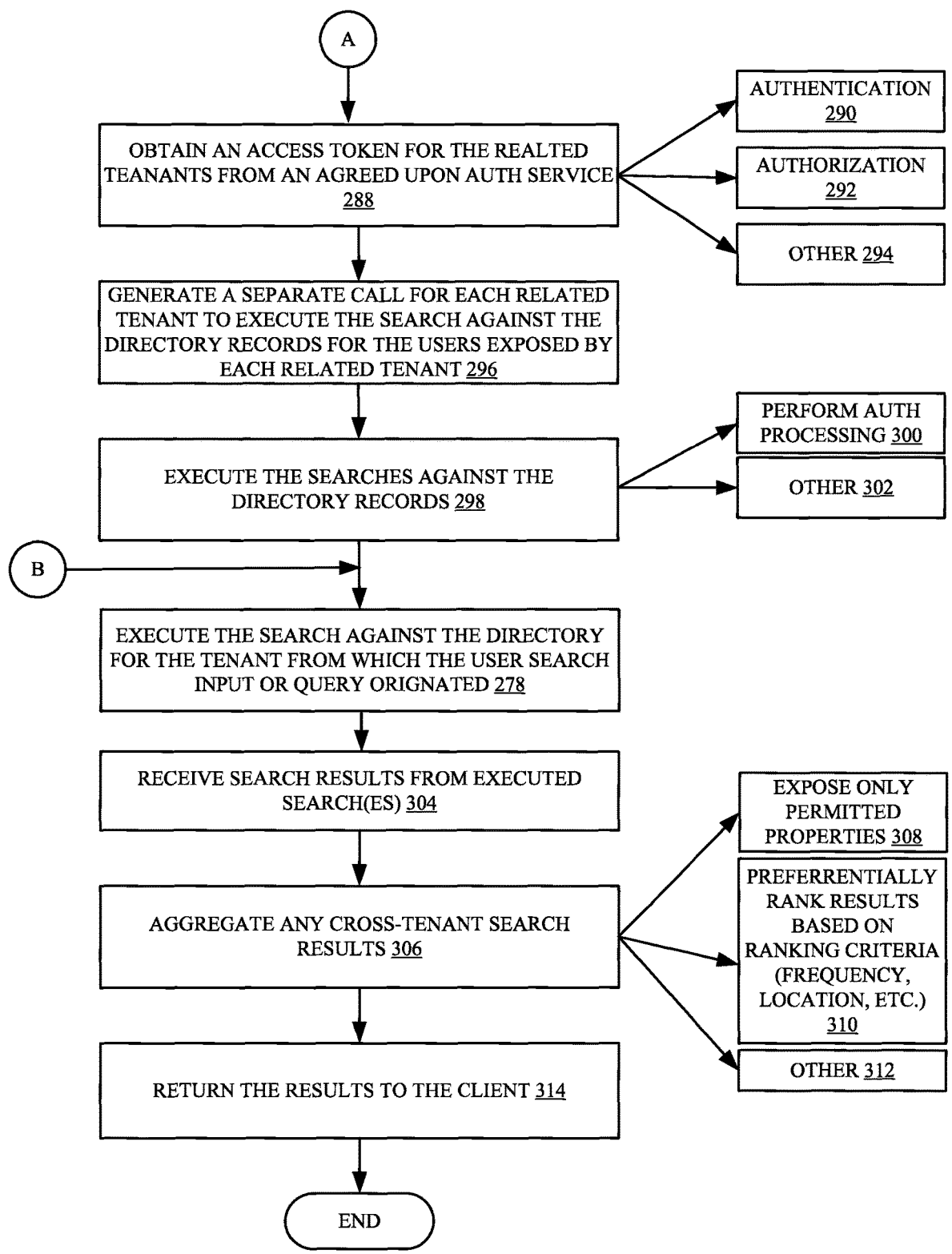

FIGS. 4A and 4B (collectively referred to herein as FIG. 4) show a flow diagram illustrating one example of the operation of computing system architecture 100 in enabling a user to perform a cross-tenant user search. For purposes of the discussion of FIG. 4, it will be assumed that the requesting user is user 116 who is generating a user search request through interfaces 124 on client device 104. It is also assumed that user 116 belongs to the organization comprising tenant 1, and that tenant 1 has acquired tenant N so that tenant 1 and tenant N are related tenants as reflected in cross-tenant access policy 148. It is also assumed for the sake of the present discussion that the user search is performed within email system 136. As discussed above, this is only one example of a configuration that can be used for performing a user search.

Client device 104 thus exposes a user interface 124 that allows user 116 to input a user search query. Client device 104 then makes a call with the user search input or query to at least one of user search processor 160 or cross-tenant user search system 162. Receiving the user search input or query through a search interface on a client of tenant 1 is indicated by block 250 in the flow diagram of FIG. 4. Again, in one example, the input or query can be received through the mailbox of user 116 in email system 136, as indicated by block 252. The search input or query can include any of a wide variety of different types of search terms, such as a username 254, a user email address 256, a user's title 258, an office location 260 of a user, other properties or information 262, or a combination of different properties, as indicated by block 264.

Call processor 200 then processes the call and tenant identifier 202 identifies the tenant (tenant 1) from which the search input or query originated. Policy accessing component 210 then obtains access to the policy store 146 which includes the cross-tenant access policies 148-150. Policy accessing component 210 then identifies any policies 148-150 that correspond to tenant 1. Processing the call to identify the tenant from which the call was originated and obtain access to a cross-tenant access policy is indicated by block 266 in the flow diagram of FIG. 4.

The accessed policy may identify related tenants as indicated by block 268 and may identify directory records that can be shared between the related tenants (e.g., in response to user searches generated by the related tenants), as indicated by block 270. The access policy can be obtained in other ways and can include other information as well, as indicated by block 272.

Policy evaluation system 212 then evaluates the cross-tenant access policy to identify whether any related tenants (and thus to identify whether the user records in the directory of any other tenants e.g., in directory 186 of related tenant N) are to be searched. Related tenant identifier 218 evaluates the cross-tenant access policy to identify such related tenants, as indicated by block 274. If there are no related tenants to be searched as indicated by block 276, then search execution system 222 executes the search against the directory 168 for the tenant from which the search input or query originated.

However, if, at block 276 it is determined that there are related tenants that are to be searched, then user identifier 220 identifies user records in the directory of each related tenant that are exposed for the search. For instance, user identifier 220 may evaluate both sides of the cross-tenant access policy to determine which users in tenant 1 may have access to information about users in tenant N and which users in tenant N may be accessed by users in tenant 1. Identifying users in each related tenant by evaluating both sides of the cross-tenant access policy is indicated by block 280 in the flow diagram of FIG. 4. In the present example, this evaluation will identify a subset of data records in directory 184 of related tenant N that are to be searched. Searchable shard generator 214 then generates a data shard (or other searchable data structure) that includes, a set of directory records for the identified users that can be searched, for each related tenant, as indicated by block 282 in the flow diagram of FIG. 4. For instance, searchable data shard generator 214 generates a data shard that includes the records 186-188 in directory 184 that correspond to users which can be searched by user 116. Where there is a plurality of related tenants, then, generator 214 may generate a separate data shard for the users in each related tenant that may be searched by user 116. Generating a separate data shard for the users that may be searched in each related tenant is indicated by block 284. The data structure that includes the searchable set of directory records for the identified users may be generated in other ways as well, as indicated by block 286.

When the directory records of related tenants are to be searched, authentication system 206 interacts with auth service 114 (which may be agreed upon by the related tenants) to obtain an access token for accessing the directories of the related tenants. Obtaining the access token is indicated by block 288 in the flow diagram of FIG. 4. The access token can be used for authentication 290, authorization 292, or the authentication and authorization information can be obtained in other ways as well, as indicated by block 294.

Fan out call generator 207 then generates a separate call for each related tenant to execute the user search input or query against the directory records for the users exposed by each related tenant. Generating these separate fan out calls is indicated by block 296 in the flow diagram of FIG. 4. Search execution system 222 then executes the searches against the directory records, as indicated by block 298 in the flow diagram of FIG. 4. As part of the search execution, authorization and authentication processing may be performed, as indicated by block 300. The searches may be executed in a wide variety of other ways as well, as indicated by block 302.

Once the user search input or query has been executed against directory 168 and against the directory records for all related tenants, search result generator 224 receives the search results from the executed searches as indicated by block 304, and search result aggregator 228 aggregates any cross-tenant search results. Aggregating the cross-tenant search results in this way is indicated by block 306. Property identifier 230 may then process the search results to expose only properties that are permitted for exposure to user 116, as indicated by block 308. Ranking system 232 may preferentially rank the search results based upon any of a wide variety of different ranking criteria, such as the frequency with which user 116 contacts the users associated with the search results, the location of the users, or other ranking criteria. Preferentially ranking the results based on ranking criteria is indicated by block 310 in the flow diagram of FIG. 4. The search results can be aggregated in other ways as well, as indicated by block 312 in the flow diagram of FIG. 4. User search processor 160 then provides the search results to client device 104 which surfaces them on a user interface 124 for user 116. Returning the search results is indicated by block 314 in the flow diagram of FIG. 4.

It can thus be seen that the present description describes a system in which cross-tenant searching can be done in an efficient manner. Instead of manually exporting directories from different clients and manually importing them into other clients, a policy is generated which identifies related tenants and the users that are searchable across those tenants. The policy can easily be updated to reflect changes in users, thus making the searching much more efficient, less cumbersome, and less error prone.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
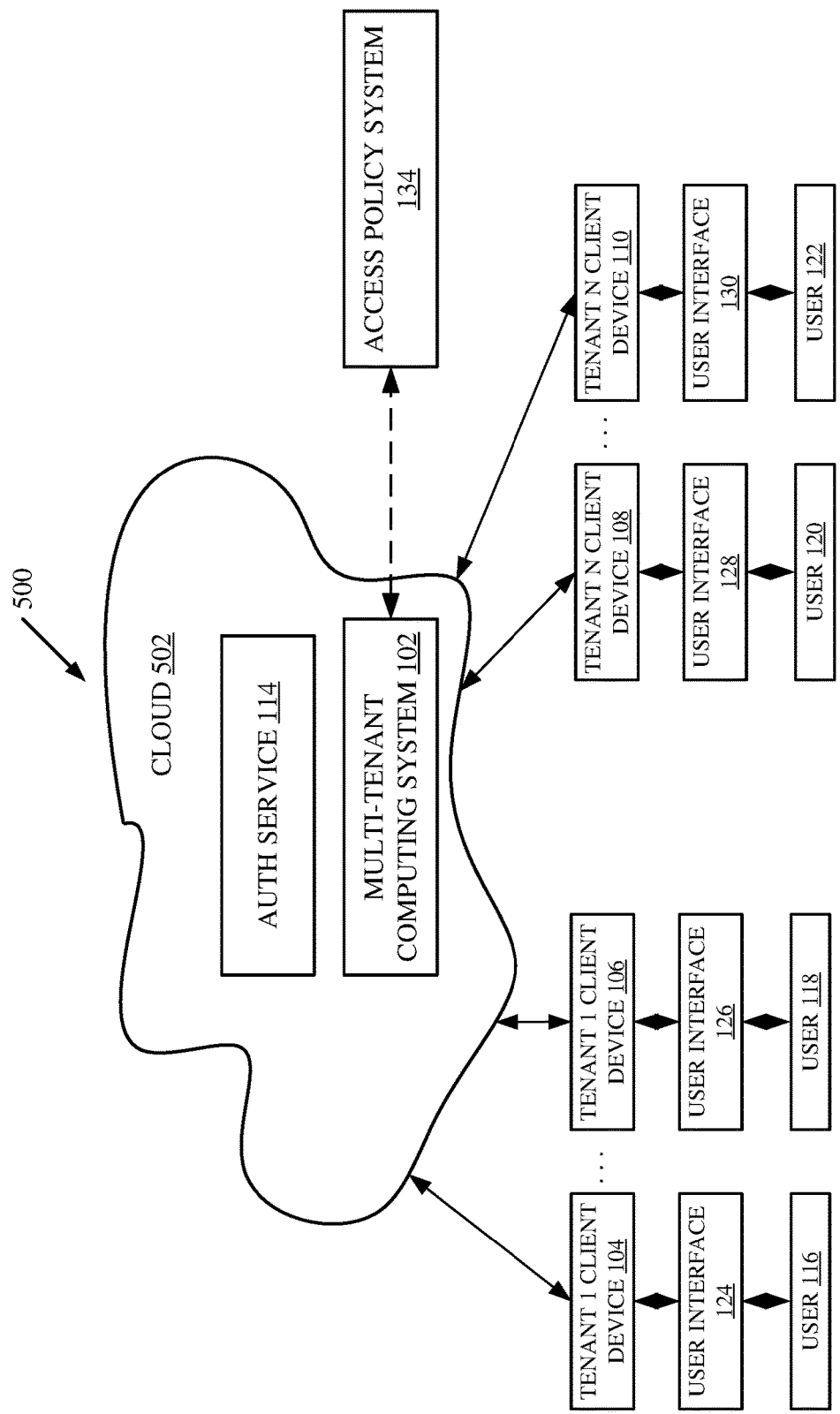
FIG. 5 is a block diagram showing one example of a multi-tenant computing system in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that multi-tenant computing system 102 can be located in cloud 502 (which can be public, private, or a combination where portions are public while others are private).

FIG. 5 also depicts another example of a cloud architecture. FIG. 5 shows that it is also contemplated that some elements of computing system 102 can be disposed in cloud 502 while others are not. By way of example, access policy system 134 can be disposed outside of cloud 502, and accessed through cloud 502. Regardless of where the systems are located, the systems can be accessed directly by the client devices through a network (either a wide area network or a local area network), the systems can be hosted at a remote site by a service, or the systems can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
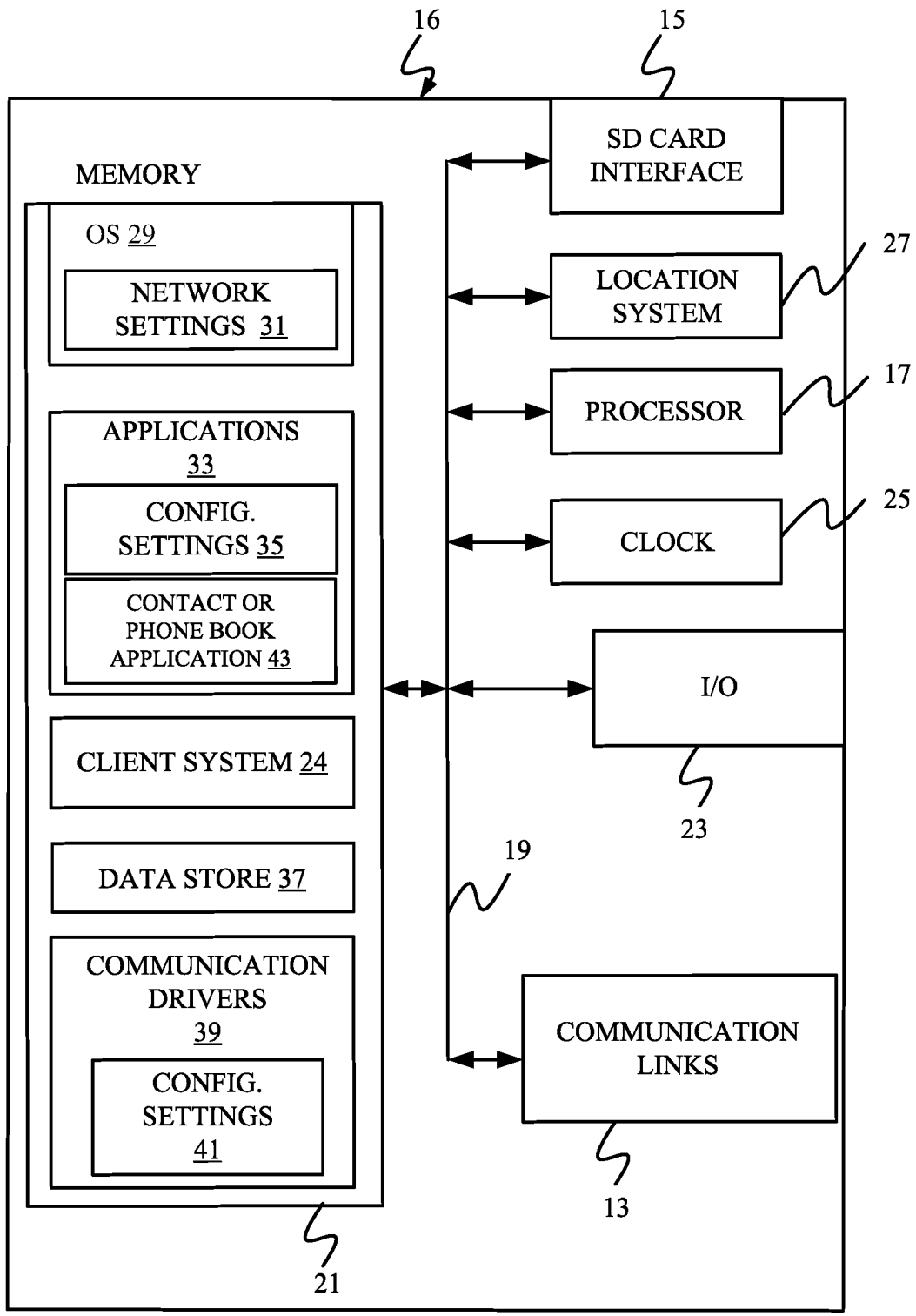
FIGS. 6-8 show examples of mobile devices that can be used in the architectures shown in the previous figures.
Figure 7:
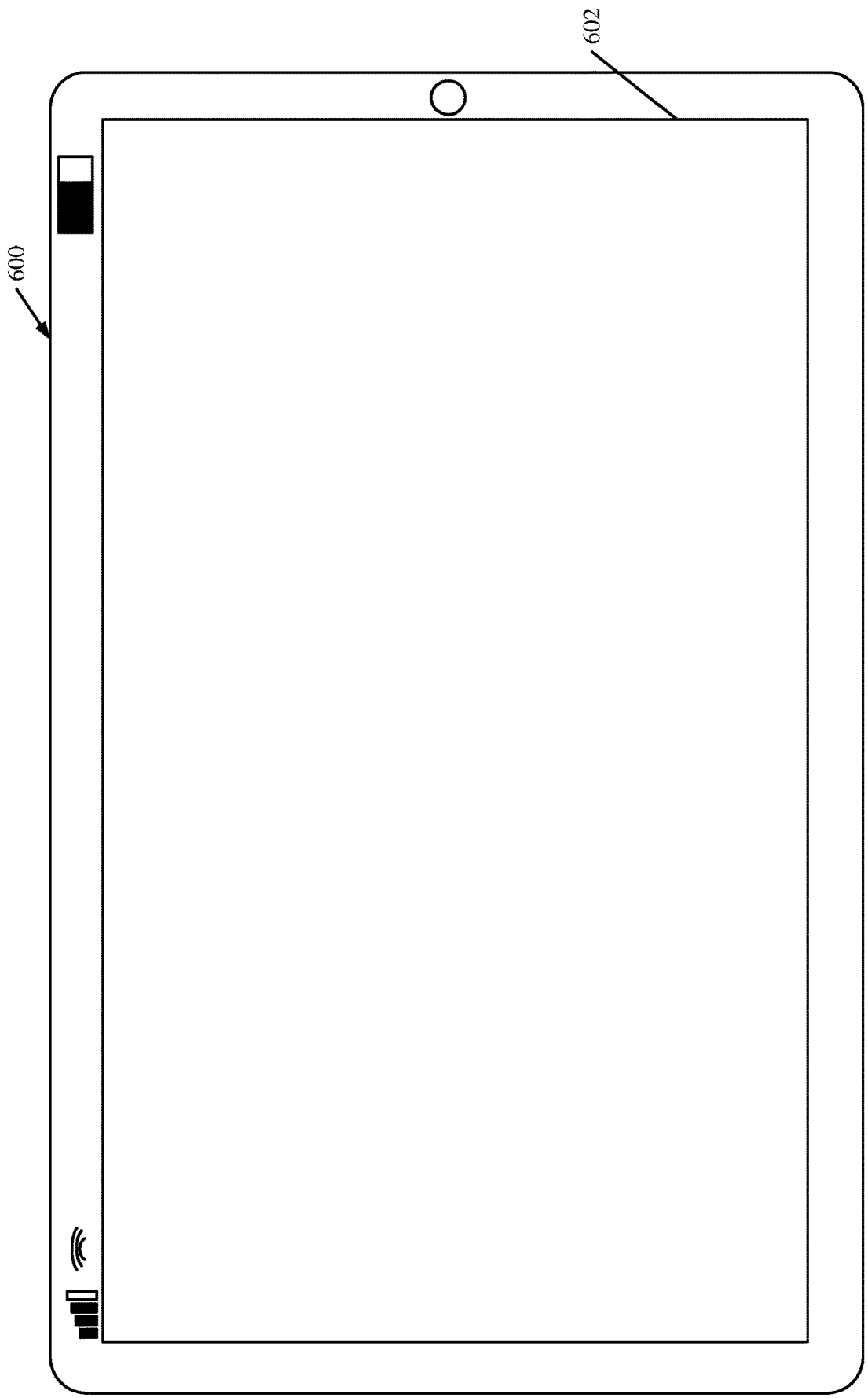
Figure 8:
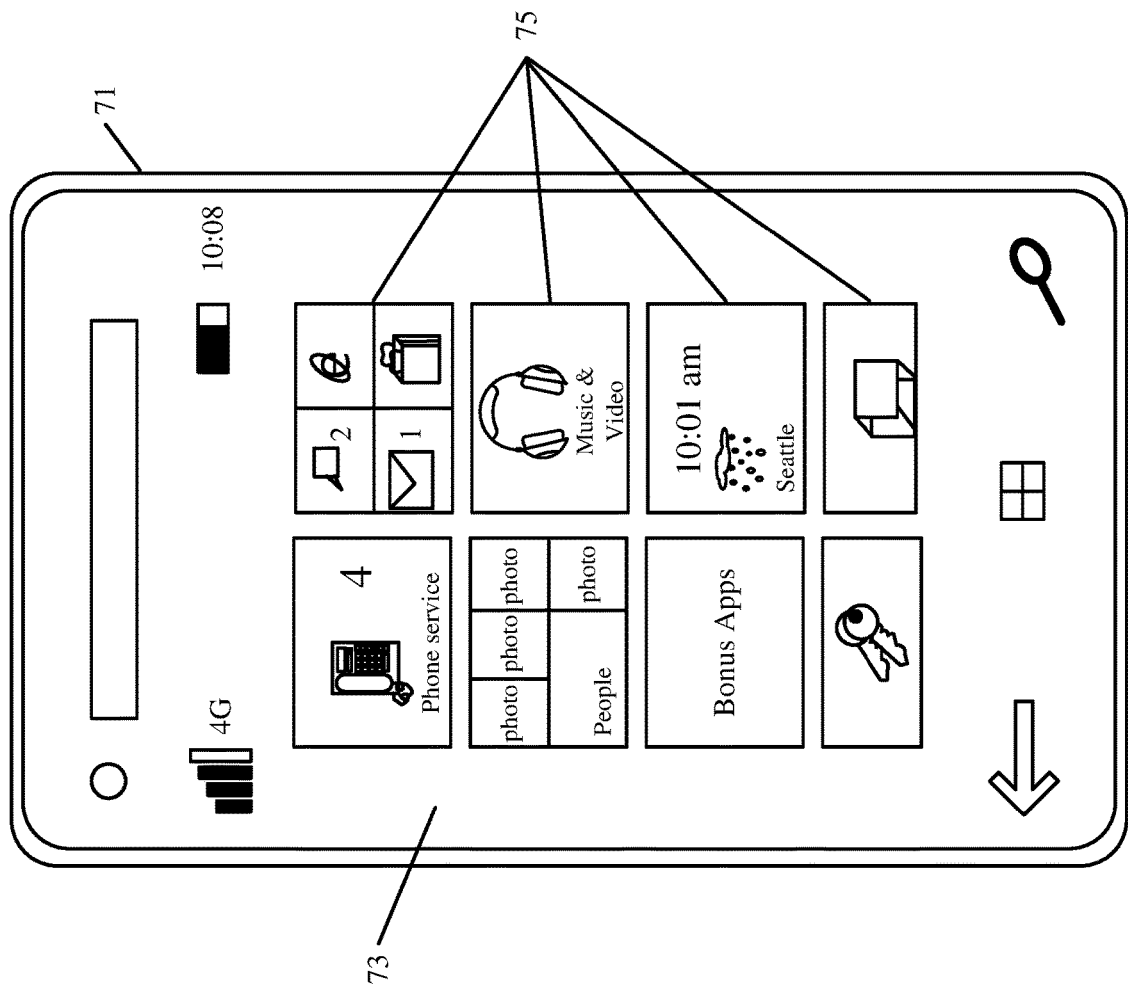

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of computing system 102 or the client devices or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
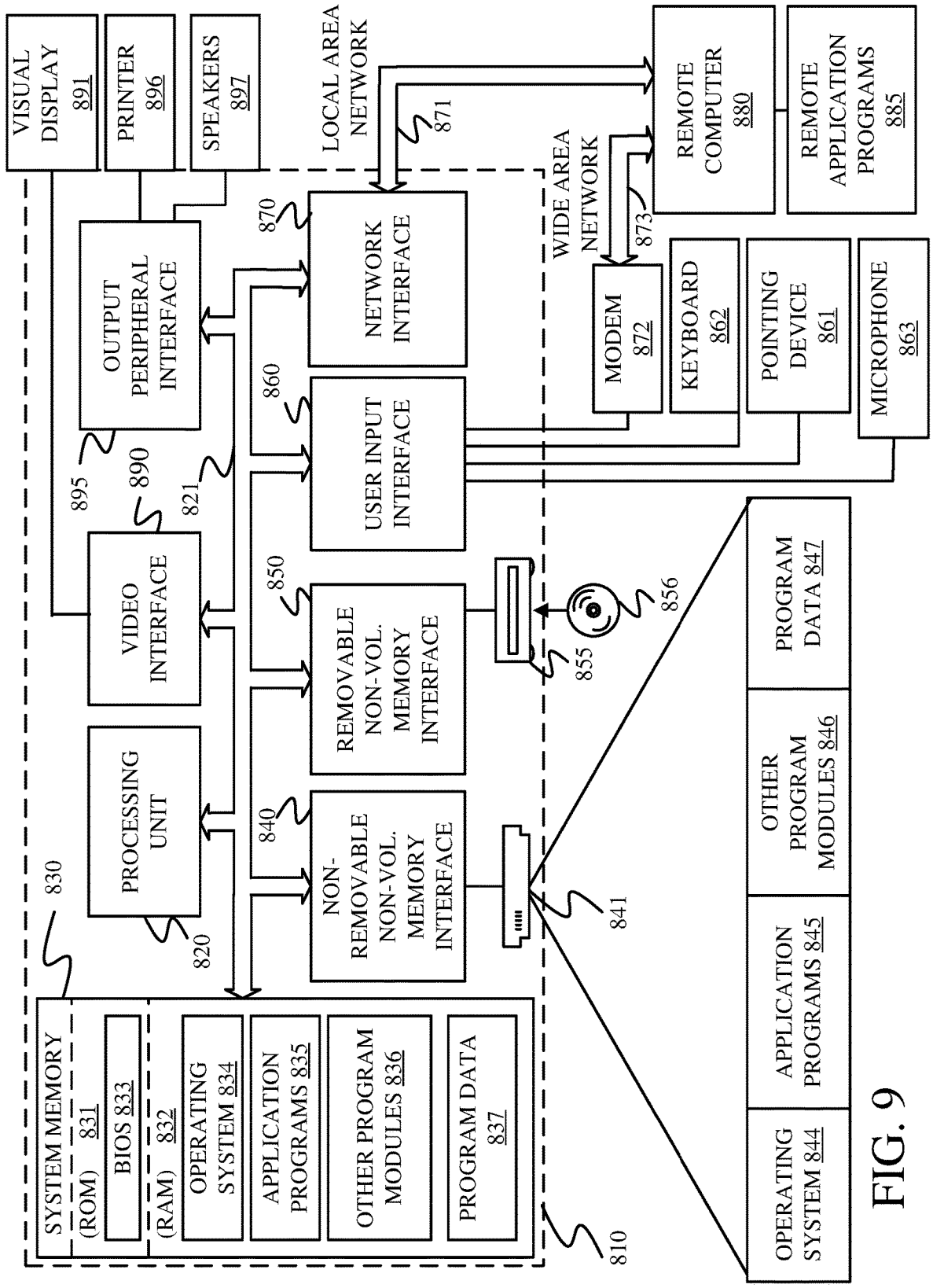
FIG. 9 is a block diagram of one example of a computing environment that can be used in the architectures shown in the previous figures.

FIG. 9 is one example of a computing environment in which architecture 100, or parts of it, (for example) can be deployed. With reference to FIG. 9, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer system, comprising:
a cross-tenant user search system that receives a user search input, from a client computing system of a first tenant in a multi-tenant computing system, the first tenant having a first user directory having user records corresponding to users of the first tenant;
a policy accessing component that identifies a cross-tenant access policy corresponding to the first tenant;
an access policy processing system that identifies, based on the cross-tenant access policy, a set of user records from a second user directory having records corresponding to users of a second tenant;

a search execution system that executes a first search, based on the user search input, of the first user directory to obtain a first set of search results and executes a second search, based on the user search input, of the set of user records from the second directory to obtain a second set of search results; and a search result generator that aggregates the first set of search results and the second set of search results to obtain an aggregated set of search results and returns the aggregated set of search results to the client computing system.

Example 2 is the computer system of any or all previous examples wherein the access policy processing system comprises:

a policy evaluation system that processes the cross-tenant access policy to identify user records in the second directory that are identified in the cross-tenant access policy as user records that can be exposed to user searches from users in the first directory and that identifies user records in the first directory as identifying users that have access to user records in the second directory.

Example 3 is the computer system of any or all previous examples wherein the search execution system is configured to execute the first search of the user records in the first directory, each user record in the first directory including a set of properties of a corresponding user.

Example 4 is the computer system of any or all previous examples and further comprising:

a searchable data shard generator configured to generate a separate data shard including a list of the set of user records from the second directory identified based on the cross-tenant access policy.

Example 5 is the computer system of any or all previous examples wherein the search execution system is configured to execute the second search by searching the separate data shard based on the search user input.

Example 6 is the computer system of any or all previous examples wherein each user record has a set of properties corresponding to a user and further comprising:

a property identifier configured to, prior to returning the aggregated search results, for each record in the first and second sets of search results, identify, as exposable properties, the properties that can be exposed in response to the user search input.

Example 7 is the computer system of any or all previous examples wherein the search result generator is configured to return only the properties in the aggregated set of search results that are identified as exposable properties.

Example 8 is the computer system of any or all previous examples wherein the search result generator comprises:

a ranking system configured to preferentially rank the aggregated search results based on a ranking criterion to obtain ranked aggregated search results and wherein the search result generator is configured to return the ranked aggregated search results to the client computing system.

Example 9 is the computer system of any or all previous examples and further comprising:

an electronic mail system configured to expose a user search input interface mechanism through an electronic mail service and receive the user search input through the exposed user search input interface mechanism.

Example 10 is a computer implemented method, comprising:

obtaining a user search input, from a client computing system of a first tenant, at a multi-tenant computing system, the first tenant having a first user directory having user records corresponding to users of the first tenant;

identifying a cross-tenant access policy corresponding to the first tenant;

identifying, based on the cross-tenant access policy, a set of user records from a second user directory having records corresponding to users of a second tenant;

executing a first search, based on the user search input, of the first user directory to obtain a first set of search results;

executing a second search, based on the user search input, of the set of user records from the second directory to obtain a second set of search results;

aggregating the first set of search results and the second set of search results to obtain an aggregated set of search results; and returning the aggregated set of search results to the client computing system.

Example 11 is the computer implemented method of any or all previous examples wherein identifying a set of user records from the second user directory comprises:

processing the cross-tenant access policy to identify user records in the second directory that are identified in the cross-tenant access policy as user records that can be exposed to user searches from users in the first directory.

Example 12 is the computer implemented method of any or all previous examples and further comprising:

identifying user records in the first directory as identifying users that have access to user records in the second directory.

Example 13 is the computer implemented method of any or all previous examples wherein executing the first search comprises:

executing the first search of the user records in the first directory, each user record in the first directory including a set of properties of a corresponding user.

Example 14 is the computer implemented method of any or all previous examples and further comprising:

generating a separate data shard including a list of the set of user records from the second directory identified based on the cross-tenant access policy.

Example 15 is the computer implemented method of any or all previous examples wherein executing the second search comprises:

executing the second search of the separate data shard based on the search user input.

Example 16 is the computer implemented method of any or all previous examples wherein each user record has a set of properties corresponding to a user and further comprising:

prior to returning the aggregated search results, for each record in the first and second sets of search results, identifying as exposable properties the properties that can be exposed in response to the user search input.

Example 17 is the computer implemented method of any or all previous examples wherein returning the aggregated set of search results comprises:

returning only the properties in the aggregated set of search results that are identified as exposable properties.

Example 18 is the computer implemented method of any or all previous examples wherein returning the aggregated search results comprises:

preferentially ranking the aggregated search results based on a ranking criterion to obtain ranked aggregated search results; and returning the ranked aggregated search results to the client computing system.

Example 19 is the computer implemented method of any or all previous examples wherein obtaining a search input comprises:

exposing a user search input interface mechanism through an electronic mail service; and receiving the user search input through the exposed user search input interface mechanism.

Example 20 is a computer system, comprising:

at least one processor; and memory storing computer executable instructions which, when executed by the one or more processors, cause the one or more processors to perform steps comprising:

obtaining a user search input, from a client computing system of a first tenant, at a multi-tenant computing system, the first tenant having a first user directory having user records corresponding to users of the first tenant;

identifying a cross-tenant access policy corresponding to the first tenant;

identifying, based on the cross-tenant access policy, a set of user records from a second user directory having records corresponding to users of a second tenant;

executing a first search, based on the user search input, of the first user directory to obtain a first set of search results;

executing a second search, based on the user search input, of the set of user records from the second directory to obtain a second set of search results;

aggregating the first set of search results and the second set of search results to obtain an aggregated set of search results; and returning the aggregated set of search results to the client computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:

at least one processor; and a computer storage medium storing computer executable instructions which, when executed by the at least one processor, cause the at least one processor to implement:

a cross-tenant user search system that receives a user search input, from a client computing system of a first tenant in a multi-tenant computing system, the first tenant having a first user directory having user records corresponding to users of the first tenant;

a policy accessing component that identifies a cross-tenant access policy corresponding to the first tenant;

an access policy processing system that identifies, based on the cross-tenant access policy, a set of user records from a second user directory having user records corresponding to users of a second tenant, each user record having a set of properties corresponding to a user;

a search execution system that executes a first search, based on the user search input, of the user records in the first user directory to obtain a first set of search results and executes a second search, based on the user search input, of the set of user records from the second directory to obtain a second set of search results;

a property identifier configured to, for each user record in the first set of search results and for each user record in the second set of search results, identify, as exposable properties, the properties that can be exposed in response to the user search input; and a search result generator that aggregates the first set of search results and the second set of search results to obtain an aggregated set of search results and returns the aggregated set of search results to the client computing system.

2. The computer system of claim 1 wherein the access policy processing system comprises:

a policy evaluation system that processes the cross-tenant access policy to identify user records in the second directory that are identified in the cross-tenant access policy as user records that can be exposed to user searches from users in the first directory and that identifies user records in the first directory as identifying users that have access to user records in the second directory.

3. The computer system of claim 1 wherein the search execution system is configured to execute the first search of the user records in the first directory, each user record in the first directory including a set of properties of a corresponding user.

4. The computer system of claim 3 and further comprising:

a searchable data shard generator configured to generate a separate data shard including a list of the set of user records from the second directory identified based on the cross-tenant access policy.

5. The computer system of claim 4 wherein the search execution system is configured to execute the second search by searching the separate data shard based on the search user input.

6. The computer system of claim 1 wherein the search result generator is configured to return only the properties in the aggregated set of search results that are identified as exposable properties.

7. The computer system of claim 1 wherein the search result generator comprises:

a ranking system configured to preferentially rank the aggregated search results based on a ranking criterion to obtain ranked aggregated search results and wherein the search result generator is configured to return the ranked aggregated search results to the client computing system.

8. The computer system of claim 1 and further comprising:

an electronic mail system configured to expose a user search input interface mechanism through an electronic mail service and receive the user search input through the exposed user search input interface mechanism.

9. A computer implemented method, comprising:

obtaining a user search input, from a client computing system of a first tenant, at a multi-tenant computing system, the first tenant having a first user directory having user records corresponding to users of the first tenant;

identifying a cross-tenant access policy corresponding to the first tenant;

identifying, based on the cross-tenant access policy, a set of user records from a second user directory having user records corresponding to users of a second tenant, each user record having a set of properties corresponding to a user;

executing a first search, based on the user search input, of the user records in the first user directory to obtain a first set of search results;

executing a second search, based on the user search input, of the set of user records from the second directory to obtain a second set of search results;

aggregating the first set of search results and the second set of search results to obtain an aggregated set of search results;
identifying, as exposable properties for each user record in the first and second sets of search results, properties that can be exposed in response to the user search input; and
returning the aggregated set of search results to the client computing system.

10. The computer implemented method of claim 9 wherein identifying a set of user records from the second user directory comprises:
processing the cross-tenant access policy to identify user records in the second directory that are identified in the cross-tenant access policy as user records that can be exposed to user searches from users in the first directory.

11. The computer implemented method of claim 10 and further comprising:
identifying user records in the first directory as identifying users that have access to user records in the second directory.

12. The computer implemented method of claim 9 wherein executing the first search comprises:
executing the first search of the user records in the first directory, each user record in the first directory including a set of properties of a corresponding user.

13. The computer implemented method of claim 12 and further comprising:
generating a separate data shard including a list of the set of user records from the second directory identified based on the cross-tenant access policy.

14. The computer implemented method of claim 13 wherein executing the second search comprises:
executing the second search of the separate data shard based on the search user input.

15. The computer implemented method of claim 9 wherein returning the aggregated set of search results comprises:
returning only the properties in the aggregated set of search results that are identified as exposable properties.

16. The computer implemented method of claim 9 wherein returning the aggregated search results comprises:
preferentially ranking the aggregated search results based on a ranking criterion to obtain ranked aggregated search results; and
returning the ranked aggregated search results to the client computing system.

17. The computer implemented method of claim 9 wherein obtaining a search input comprises:
exposing a user search input interface mechanism through an electronic mail service; and
receiving the user search input through the exposed user search input interface mechanism.

18. A computer system, comprising:
at least one processor; and
memory storing computer executable instructions which, when executed by the one or more processors, cause the one or more processors to perform steps comprising:
obtaining a user search input, from a client computing system of a first tenant, at a multi-tenant computing system, the first tenant having a first user directory having user records corresponding to users of the first tenant;
identifying a cross-tenant access policy corresponding to the first tenant;
identifying, based on the cross-tenant access policy, a set of user records from a second user directory having user records corresponding to users of a second tenant, each user record having a set of properties corresponding to a user;
executing a first search, based on the user search input, of the user records in the first user directory to obtain a first set of search results;
executing a second search, based on the user search input, of the set of user records from the second directory to obtain a second set of search results;
aggregating the first set of search results and the second set of search results to obtain an aggregated set of search results;
identifying, as exposable properties in each user record in the first and second sets of search results, properties that can be exposed in response to the search user input; and
returning the aggregated set of search results to the client computing system.

* * * * *